(12) United States Patent
Brofos et al.

(10) Patent No.: US 12,456,384 B2
(45) Date of Patent: Oct. 28, 2025

(54) SYSTEM AND METHODS FOR IMPLEMENTING AN UNMANNED AIRCRAFT TRACKING SYSTEM

(71) Applicant: The MITRE Corporation, McLean, VA (US)

(72) Inventors: Alex Brofos, Hopkinton, NH (US); Brett C. Bishop, Waltham, MA (US); Craig P. Vandervest, Lutherville Timonium, MD (US)

(73) Assignee: The MITRE Corporation, McLean, VA (US)

( * ) Notice: Subject to any disclaimer, the term of this patent is extended or adjusted under 35 U.S.C. 154(b) by 1517 days.

(21) Appl. No.: 16/842,563

(22) Filed: Apr. 7, 2020

(65) Prior Publication Data

US 2024/0331553 A1    Oct. 3, 2024

Related U.S. Application Data

(60) Provisional application No. 62/830,973, filed on Apr. 8, 2019.

(51) Int. Cl.
*G08G 5/72* (2025.01)
*G01S 13/91* (2006.01)
(Continued)

(52) U.S. Cl.
CPC ............. *G08G 5/727* (2025.01); *G01S 13/91* (2013.01); *G01S 13/933* (2020.01); *G08G 5/22* (2025.01)

(58) Field of Classification Search
CPC .... G08G 5/0082; G08G 5/0026; G08G 5/727; G08G 5/22; G01S 13/933; G01S 13/91
(Continued)

(56) References Cited

U.S. PATENT DOCUMENTS

2007/0024494 A1* 2/2007 Dizaji ................... G01S 13/723
  342/195
2015/0204973 A1* 7/2015 Nohara ................... G01S 7/003
  342/107
(Continued)

OTHER PUBLICATIONS

He et al. "Diverse Visualization Techniques and Methods of Moving-Object-Trajectory Data: A Review," ISPRS Int. J. Geo-Inf. Jan. 29, 2019, 8(2), 63; https://doi.org/10.3390/ijgi8020063, pp. 1-50 (Year: 2019).*

*Primary Examiner* — William Kelleher
*Assistant Examiner* — Samarina Makhdoom
(74) *Attorney, Agent, or Firm* — Morrison & Foerster LLP (57) ABSTRACT

A system and method for identifying slow-moving and smaller flying objects using one or more radar based sensors is provided. In one or more examples, a radar system can be configured to generate plot data corresponding to flying objects in a given airspace. A tracker can be configured to receive the plot data, and can be configured to generate one or more tracks. The one or more tracks generated by the tracker can then be inputted into a classifier that is configured to distinguish unmanned aerial vehicle (UAV) traffic from birds that are flying in the airspace. In one or more examples, the classifier can generate an N-dimensional hypercube, with each dimension of the hypercube pertaining to a specific attribute of the flying objects. Each track can be converted into a data point within the hypercube and the data points can be clustered to determine whether the track belongs to a bird or a UAV.

30 Claims, 8 Drawing Sheets

(51) Int. Cl.
    *G01S 13/933*    (2020.01)
    *G08G 5/22*    (2025.01)

(58) Field of Classification Search
    USPC .................................................... 342/25 B
    See application file for complete search history.

(56) References Cited

U.S. PATENT DOCUMENTS

2016/0363652 A1* 12/2016 Hamminga ............. G01S 19/03
2018/0164431 A1* 6/2018 Kalyandurg ............ G01S 13/06

* cited by examiner

SYSTEM AND METHODS FOR IMPLEMENTING AN UNMANNED AIRCRAFT TRACKING SYSTEM

CROSS-REFERENCE TO RELATED APPLICATIONS

This application claims priority to U.S. Provisional Application No. 62/830,973 filed Apr. 8, 2019, the entire contents of which are incorporated herein by reference.

STATEMENT REGARDING FEDERALLY SPONSORED RESEARCH OR DEVELOPMENT

This invention was made with Government support under U.S. Government contract W56KGU-18-D-0004-0001/V270 awarded by the United States Air Force. The Government has certain rights in this invention.

FIELD OF THE DISCLOSURE

This disclosure relates to the tracking of unmanned aircraft in a given airspace using a sensor or radar-based system and methods for classifying the data received from the sensor or radar to differentiate unmanned aircraft from other slower flying objects such as birds.

BACKGROUND OF THE DISCLOSURE

Radar has long been employed as an effective tool for identifying and tracking aircraft during flight. Radar data can be used by commercial and military enterprises to "track" various aircraft transiting a given airspace. Tracking can refer to not only labeling and monitoring the trajectory and flight path of a given aircraft consistently and persistently, but can also refer to estimating the aircraft's speed and altitude as examples.

While radar has proven to be effective at tracking high-speed flying objects such as commercial or military aircraft, it has not met with such success in effectively tracking slower moving flying objects such as unmanned aerial vehicles ("UAV"). In a given airspace there can be many objects in flight such as commercial or military aircraft, UAVs, and even birds. In order to identify and track aircraft, a radar's sensitivity can be tuned so as to only process data that exceed a certain pre-determined signal threshold and radial rate. However, if a radar operator turns up the sensitivity of the radar system so as to allow the radar system to detect smaller and slower moving objects such as UAVs, they will also detect birds that have the same size and speed as UAVs. Thus, when attempting to track UAVs using radar, the useful data collected by the radar system may be overloaded with extraneous data of other slow-moving objects like birds, making the process of tracking a UAV difficult and impractical operationally.

Thus a system and method that can collect data on slower moving flying object and that can classify and discriminate the collected data to determine which data is associated with a UAV and which data may be associated with other slow moving flying objects like birds can provide operators with a superior ability to not only track fast moving commercial and military aircraft, but UAVs as well.

SUMMARY OF THE DISCLOSURE

Accordingly, systems and methods for classifying and tracking slower moving aircraft that can discriminate between aircraft and other slower moving flying objects like birds are provided. In one or more examples, a radar system can be coupled to a tracker that is tuned to track slower moving objects. The tracker can then be coupled to a classifier that utilizes an unsupervised learning model to automatically discriminate between UAV flight tracks and tracks of birds or other slow-moving flying objects and continue to do so with minimal or no operator intervention when both UAV and clutter environments change.

In one or more examples, the systems and methods can also provide a visualization to an operator of the system that shows the operators current aircraft that are being tracked, while actively rejecting tracks that belong to non-UAV objects such as birds. Alternatively, in one or more examples, the systems and methods can provide a visual cue to an operator to aid them in identifying which tracks belong to aircraft and UAVs and which tracks belongs to birds.

DETAILED DESCRIPTION OF THE DISCLOSURE

The following description sets forth exemplary methods, parameters, and the like. It should be recognized, however, that such description is not intended as a limitation on the scope of the present disclosure but is instead provided as a description of exemplary embodiments.

In the following description of the disclosure and embodiments, reference is made to the accompanying drawings in which are shown, by way of illustration, specific embodiments that can be practiced. It is to be understood that other embodiments and examples can be practiced, and changes can be made, without departing from the scope of the disclosure.

In addition, it is also to be understood that the singular forms "a," "an," and "the" used in the following description are intended to include the plural forms as well unless the context clearly indicates otherwise. It is also to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations of physical quantities as modules or code devices without loss of generality.

However, all of these and similar terms are to be associated with the appropriate physical quantities and are merely convenient labels applied to these quantities. Unless specifically stated otherwise as apparent from the following discussion, it is appreciated that, throughout the description, discussions utilizing terms such as "processing," "computing," "calculating," "determining," "displaying," or the like refer to the action and processes of a computer system, or similar electronic computing device, that manipulates and transforms data represented as physical (electronic) quantities within the computer system memories or registers or other such information storage, transmission, or display devices.

Certain aspects of the present invention include process steps and instructions described herein in the form of an algorithm. It should be noted that the process steps and instructions of the present invention could be embodied in software, firmware, or hardware, and, when embodied in software, they could be downloaded to reside on, and be operated from, different platforms used by a variety of operating systems.

Radar and other similar sensors have been used to track flying objects. Generally, a sensor such as radar can be used to not only detect the presence of a flying object but can also be used to track such attributes of a flying object such as the speed of the object, direction of flight, and altitude. The data generated by a radar sensor can be used to track a flight such that a user can visualize not only the present position of a flying object but can also see where the flying object was located at previous instances of time.

Figure 1:
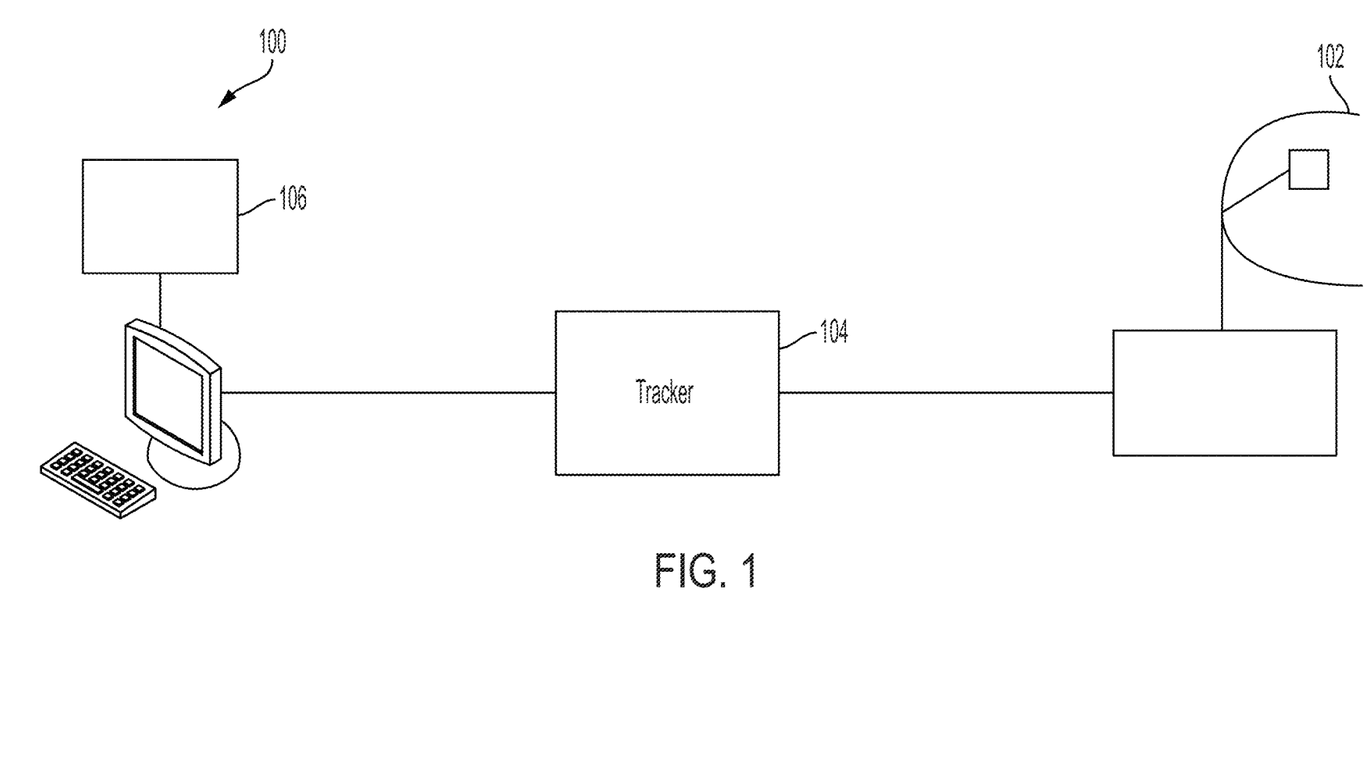
FIG. 1 illustrates an exemplary radar-based tracking system according to examples of the disclosure

FIG. 1 illustrates an exemplary radar-based tracking system according to examples of the disclosure. In the example of FIG. 1, the system 100 can include a radar sensor 102. In one or more examples the radar sensor 102 can be configured to transmit a signal into an airspace and can also be configured to receive a signal that is reflected from a flying object when the transmitted signal hits the flying object. The radar sensor 102 can also be configured to rotate. The received signals (i.e., the received reflections) can be used to generate data that can inform the operator of the radar system as to the presence of flying objects in the airspace.

In one or more examples, the data generated by the radar sensor can be passed through a thresholder (not pictured) that can eliminate any points that don't adhere to pre-determined criteria. For instance, the thresholder can be used to eliminate data that doesn't meet a pre-determined size or speed criteria. In one or more examples, the radar thresholder can be used to eliminate objects that are below a certain size or below a certain speed. For instance, in the context of aviation, commercial and military aircraft may be known to be above a certain size, and travel over a certain speed threshold. Thus, the thresholder can eliminate any data it acquires that falls below a certain size and speed threshold so as to only provide the radar operator with data that is likely to have been acquired from a commercial or military aircraft.

However, UAVs are often much smaller and travel at a slower speed than commercial or military aircraft. Thus, in order to provide the operator of the radar system with data from UAVs, in one or more examples, the thresholder within the radar sensor 102 can be "turned down" so as to increase the radar sensitivity and thus capture UAV activity. However, turning the sensitivity up on the radar sensor can also inadvertently capture other activity that would not interest a radar operator.

For instance, birds are also smaller and slower than commercial or military aircraft, and in some instances can even be the same size and travel at roughly the same speed as a UAV. Thus, if a radar sensitivity is turned up so as to provide a radar operator with data from potential UAVs flying in an airspace, the radar operator may also be provided data from birds flying in the airspace. The bird data may not be useful to the operator, and in some instances can overwhelm the operator by flooding them with extraneous data that may cause them to miss data from UAVs that they may be interested in.

The data generated by the radar sensor can be referred to as plot data. Plot data provided by a radar can be used to create a visualization of air traffic in a given airspace. As discussed above. The plot data generated from a radar can also be used to track a flying object in the airspace detected by a radar sensor. Referring back to FIG. 1, once data is acquired by radar sensor 102, and in one or more examples is passed through a thresholder as described above, the plot data can be provided to a tracker 104. The tracker 104 can be used to track specific objects detected by the radar sensor. In one or more examples, tracking can refer to plotting the flight path of a flying object. An object's flight path can refer to an indication of the object's current state (position and velocity, maneuver history, and radar cross section if available) in an airspace as well as a visual indicator of the path taken by the flying object (i.e., its past flight positions.)

In one or more examples, the tracker 104 can input plot data that includes range, azimuth, and time information of a flying object and can convert the data into a plot of the course that flying object is taking through an airspace. The tracker can thus provide an estimate of the state of what is an identified single object. In one or more examples, the tracker 104 can identify a flying object and its track and can also assign that track a numerical identifier known as a track number. A track number, in one or more examples, can serve as an identifier for a particular aircraft or flying object in an airspace. The tracker, upon acquiring a flying object, and monitoring its track, can assign a track number to the object. The track number can serve as an identifier that can be used to record the history of the flight of the object and other acquired information in a memory.

With respect to UAVs, conventional tracking systems can often fail to track UAVs. Because UAVs are slow moving and make numerous turns in an airspace (if for instance they are surveilling a target) a conventional tracker may not identify the flying object as an aircraft and may instead simply ignore the data. Therefore, in one or more examples, the tracker 104 of FIG. 1 can be configured so as to not ignore slow moving objects that turn many times during flight. The consequence of this feature can be that not only does the tracker 104 track the movement of UAVs but it can also track the movement of unintended targets such as birds. In one or more examples, the tracker can output its tracks to a computing system 106. Computing system 106 may include one or more processors and a display (as described below with respect to FIG. 7.)

In one or more examples, the tracker 104 can be configured so as to track objects that are making sharp and numerous turns. For instance, in one or more examples, the tracker can identify a track and its change in direction by examining data that appears in proximity to an already defined track and employing a covariance matrix that rotates about the hypothesized course to determine whether the data is associated with the pre-existing flight path. A covariance matrix can be used to assess the probability that a data point is associated with a pre-existing track as identified by the tracker 104. Conventional trackers often simply use a covariance matrix that is oriented in the direction of the pre-existing flight path. However, in one or more examples, when assessing whether newly acquired data is associated with a flight path, the covariance matrix can be rotated about the hypothesized course to assess the probability that a newly acquired data point is associated with a hypothesized flight path. In contrast to conventional systems that uses a single covariance matrix, the examples of the present disclosure can utilize a covariance matrix that rotates about a hypothesized flight path (as identified by a tracker).

In order to track objects that turn frequently and more sharply than a conventional aircraft, the covariance matrix can be rotated in one direction or the other (i.e., left and right) of the course of the pre-existing track to determine if a new data point is associated with it. In one or more examples, if a data point lies to the left of a given flight path course, the covariance matrix can be tilted to the left, and the probability of whether the new data point is associated with the flight path can be assessed. By rotating the covariance matrix in this way, the tracker can be configured to better track objects that turn more frequently or sharply. This feature greatly enhances the tracker's ability to track UAVs (and consequently birds) whose slow speed and maneuverability generate tracks that appear to turn more sharply and frequently than conventional military or commercial aircraft.

However, even with a tracker that is better equipped to track objects that are slower moving and turn more frequently, such a system may still not result in a radar operator being able to effectively track a UAV in a given airspace. Because birds and UAVs can often exhibit similar behavior when transiting a given air space, when the data provided by a tracker is visualized, the radar operator may not be able to tell the difference between a target of interest (i.e., a UAV) and something of non-interest such as a bird. In one or more examples, a given air space may contain so many birds, that the UAV traffic visualization may effectively be drowned out by the bird traffic resulting in an inefficient operation of the radar system.

Figure 2:
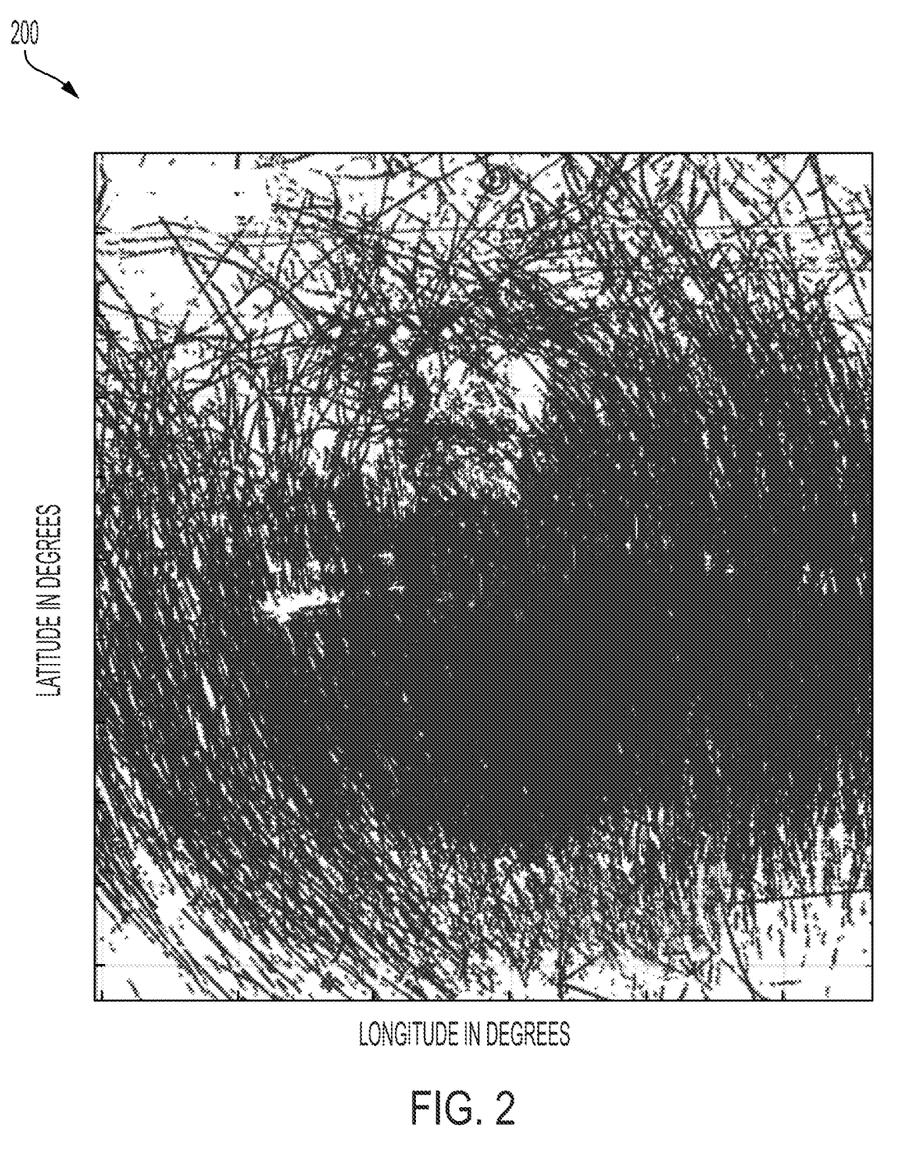
FIG. 2 illustrates an exemplary data plot generated by the radar-based tracking system of FIG. 1 according to examples of the disclosure.

FIG. 2 illustrates an exemplary data plot generated by the radar-based tracking system of FIG. 1 according to examples of the disclosure. The exemplary chart of FIG. 2 can represent a visualization provided to a radar operator based on the data provided to the computing system 106 from tracker 104. As discussed above, radar sensor 102 and tracker 104 can be configured so as to provide data from slower moving objects and objects that are smaller than conventional commercial or military aircraft. In the example of FIG. 2, chart 200 can map data from a tracker to a plot in which the x-axis represents the longitude of an object, and the y-axis can represent the latitude object. Thus, the chart 200 can represent the precise geographic location of an object as recorded by the radar sensor 102 and the tracker 104.

Because the radar sensor 102 and tracker 104 are configured to include data from slower and smaller objects transiting an airspace, the visualization provided in chart 200 can include not only UAV traffic but can also include birds flying through the airspace. In the example of FIG. 2, the particular airspace being analyzed can include numerous birds and only a few UAVs. However, when presented with the visualization in chart 200, a radar operator may be unable to discriminate between a flight path of a bird and the flight path of a UAV. This can be because the particular airspace includes many birds and therefore the chart 200 may be dominated by birds. When presented with chart 200, a radar operator may not be able to extract UAV flight paths because they are effectively drowned out by bird traffic that can obscure the flight paths of a UAV. Birds and UAVs can often exhibit similar behavior in an air space.

The fact that a tracker may present a radar operator with tracks stemming from a UAV as well as birds, can make such a system untenable and inefficient. If a tracker is unable to discriminate between birds and UAVs, the operator when presented with a visualization of the tracks in an airspace may be unable to tell the difference between the tracked birds and the tracked UAVs, and thus may not be able to focus on any UAVs of interest. Such a situation can render a radar system useless for the purpose of tracking UAVs in a given airspace.

Thus, simply "tuning" a radar system and its tracker to include data from slower moving objects and smaller objects so as to track potential UAV targets can be ineffective because an operator of the system may not be able to tell the difference between birds in an air space and a UAV. Thus, in order to effectively track UAVs a given radar system may have to determine whether a given track is from a bird or is from a UAV. In order to do so, in one or more examples, the radar system can also be outfitted with a classifier that can tell the difference between a bird and a UAV.

Figure 3:
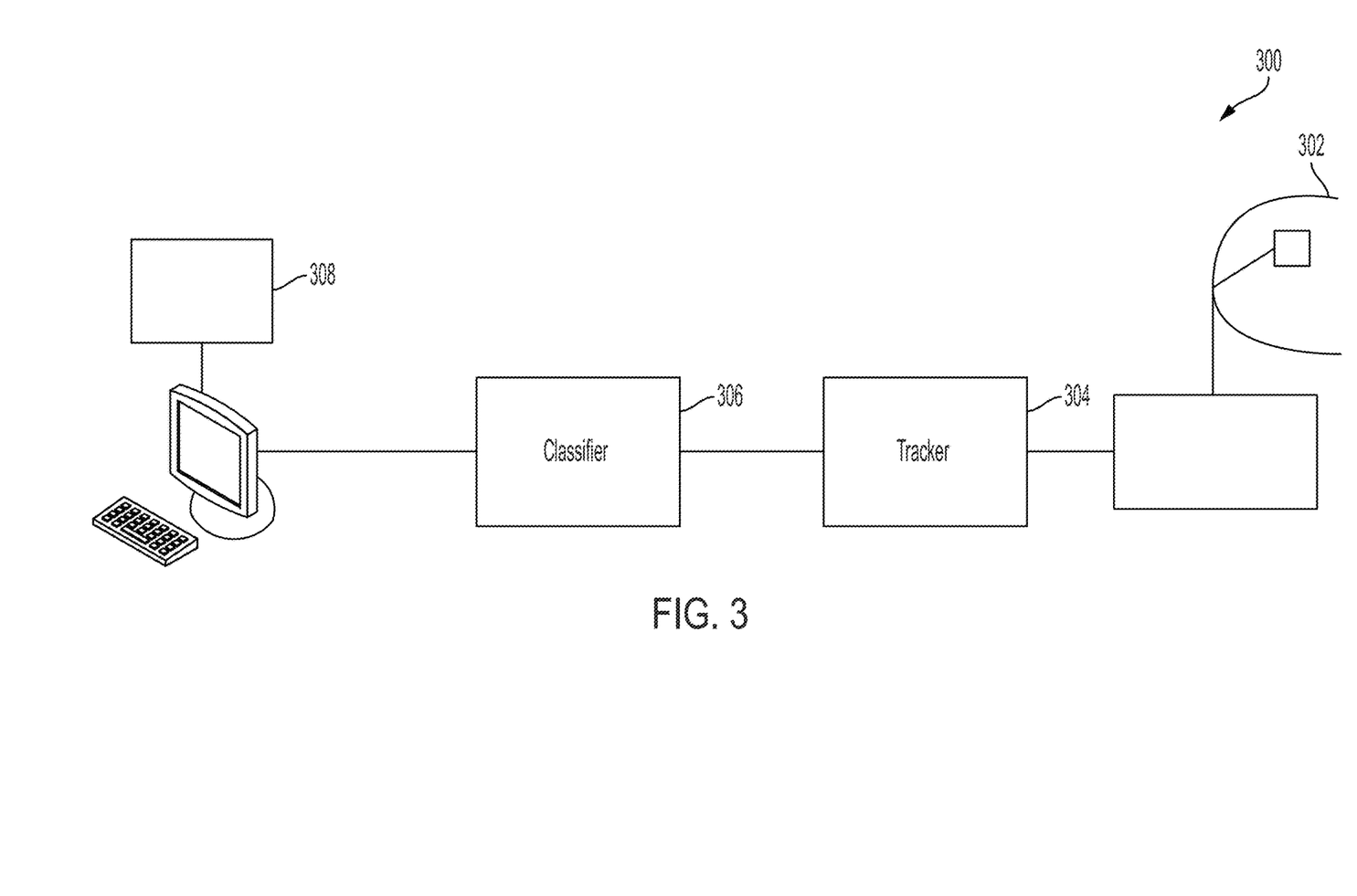
FIG. 3 illustrates an exemplary radar-based tracking system with a UAV classifier according to examples of the disclosure.

FIG. 3 illustrates an exemplary radar-based tracking system with a UAV classifier according to examples of the disclosure. The system 300 of FIG. 3 can include a radar sensor 302 and a tracker 304. The radar sensor 302 can be configured to capture data from slower moving objects and smaller objects as described with respect to radar sensor 102 of FIG. 1. The system 300 can also include a tracker 304. The tracker 304 can be configured to track objects that turn frequently and sharply and of a particular size and speed as described above with respect to tracker 104 of FIG. 1.

As discussed above, a system such as that in FIG. 3, which only includes a radar sensor 302 and tracker 304 as described above may only result in the radar operator being presented with data from UAVs and birds. A radar operator may be unable to tell the difference between these two objects when visually analyzing radar data, and thus may not be able to tell the difference between a UAV and a bird. Thus, in one or more examples, the system 300 may also include a classifier 306 that can analyze data from multiple targets such as birds and UAVs and discriminate between tracks that belong to UAVs, tracks that belong to a birds, and tracks that belong to conventional commercial or military aircraft.

In order to classify tracks identified by tracker 304 as belonging to a UAV or as belonging to something else such as a bird or conventional aircraft, a classifier 306 can implement a "hypercube" into which data generated by the tracker 304 can be placed. A hypercube can refer to a N-dimensional analogue of a cell in which each side of the hypercube can be defined by a particular attribute of a track. For instance, in the example of a four dimensional hypercube, one dimension of the cube can be defined by the speed of a target, one dimension of the cube can be defined by the height/altitude of a target, one dimension of the hypercube can be defined by the course of a target track, and one dimension of a hypercube can be defined by the age of a particular track (i.e., how long the track has persisted with a tracker.)

In one or more examples, the bounds of the hypercube can be established by pre-determined knowledge of the behavior of birds. For instance, with respect to speed, it may be known that birds do not travel faster than a certain threshold speed. Thus, the speed dimension of a hypercube can be bounded by 0 and the pre-determined threshold speed above which birds generally do not fly.

Each track identified by tracker 304 can be plotted within a hypercube by classifier 3046. Thus, each track produced by tracker 304 can be represented by a single data point that is mapped into the hypercube created by classifier 3046. Thus, a track that has a particular speed, height, course and age, can be represented by a single point within a four-dimensional hypercube. Each track can thus be mapped to a location inside the hypercube.

In one or more examples, data produced by tracker 304 can be pre-screened before being mapped to a hypercube so as to eliminate tracks that are definitely not from a bird. For instance, if a data point is outside the bounds of a particular dimension of the hypercube, that data point can be excluded from being mapped to the hypercube because it likely does not belong to a bird. For instance, if the speed of a particular track is 400 miles per hour, then that particular track can be excluded from being mapped to the hypercube because a bird is unlikely to be travelling that fast. Thus, any points that do not map into the hypercube can be excluded from the hypercube process and can be classified as a non-UAV or bird data point (such as that belonging to a conventional aircraft.)

Data points generated by tracker 304 can also be excluded based on attributes that are not part of the hypercubes. For instance, in one or more examples a data point can be excluded based on its maneuver history, as represented by a novel track maneuver metric called loop extent. Loop extent refers to a quantification of the amount of turning that an object in the airspace undergoes during the tracking of the object. In other words, if an object turns many times during its flight, it may have a high degree of loop extent. If an object doesn't turn many times, then its loop extent can be lower. Loop extent may not be a dimension of the hypercube, but it still can be used to exclude data points from the hypercube. For instance, if an object has a high degree of loop extent (i.e., making many turns in a similar directional sense) it is unlikely that the object is a bird, since birds do not turn rapidly and frequently over a given time duration. Thus, since it is unlikely that an object with a large loop extent is a bird, there may not be a need to map the object into the hypercube to determine whether the object is a bird.

In this way, the hypercube process may be more efficient since the data mapped into the cube can be reduced at the outset.

Any data points that aren't preemptively excluded as discussed above can be mapped into the hypercube. In one or more examples, each track that is passed from the tracker 304 to the classifier 306 (except those that are excluded) can be mapped into a space/unit within the hypercube based on attributes found with respect to the track. Thus, as an example and using the four-dimensional hypercube discussed above, a particular track's speed, height, course, and age, as determined by the tracker 304, can be mapped into a particular unit of the hypercube. A unit of the hypercube can refer to a subset of the hypercube that contains data points with attributes within a particular sub-range of values for each dimension of the hypercube.

Using the example of the four-dimensional cube above, a unit of the hypercube can represent a portion of the cube bounded by a sub-range of each dimension. In the instance of a hypercube defined by for example: speed, height, course, and age of track, a unit of such a hypercube can represent a smaller cube within the cube that represents points within a specific smaller sub-range of speed, height, course, and age of track.

The classifier 306 can be configured so that upon generating a hypercube as discussed above, each track produced by the tracker 304 (except for the tracks that have already been preemptively excluded) can be analyzed and then placed within a specific unit of the hypercube (or hypercubes in the example in which multiple hypercubes are used.)

In order to distinguish UAV flight from birds, the position of each track in the hypercube can be analyzed with respect to the positions of all other data points in the hypercube to classify any individual data point. If, multiple data points cluster together and occupy either the same or nearby units within the hypercube, then in one or more examples, such data points can be considered as birds by the classifier. As birds generally outnumber UAVs in a given airspace and over time, if there are multiple tracks that are mapped to the same or proximal units within a given hypercube, it is likely that the tracks all belong to the same type of aerial object and thus are likely to be birds. In an instance where a particular track's mapping to the hypercube is not proximal to any of the other tracks mapped to the hypercube, it can be more likely that that particular track belongs to a non-bird such as a UAV.

In one or more examples, the classifier 306 can divide the hypercube into two sets of units that are offset from one another but still cover the same region. In one or more examples, the two sets of units can be offset by a half of a cell from each other. The two slightly offset sets of units can be used to capture data that straddles cells in the first set of units described above.

Figure 4:
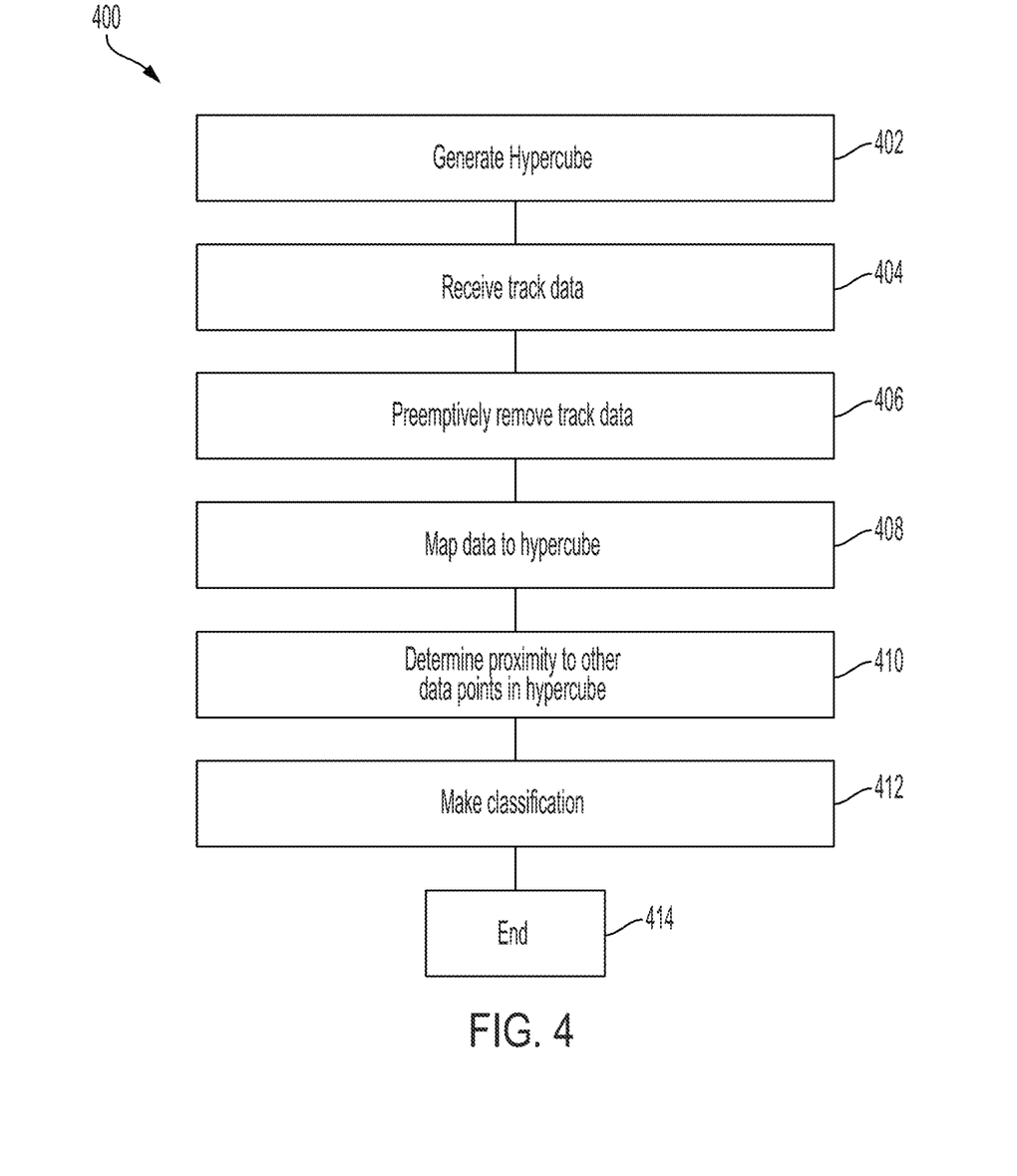
FIG. 4 illustrates an exemplary method for classifying tracks produced by a tracker according to examples.

FIG. 4 illustrates an exemplary method for classifying tracks produced by a tracker according to examples. The process 400 of FIG. 4 can be implemented in a classifier, such as the classifier 306 discussed above with respect to FIG. 3. The process can begin at step 402 wherein the classifier 306 can generate a hypercube as described above. Once the hypercube has been generated at step 402, the process moves to step 404 wherein the classifier 306 receives track data from a tracker 304.

Once a data point is received from the tracker 302, it can be analyzed to determine whether the data point should be preemptively removed based on one or more attributes of the data point. For instance, and as described above in detail, the data point can be removed if it cannot be mapped or it goes beyond a pre-defined threshold. If a data point is removed, in one or more examples, the data point can be classified as a particular category of flying object. For instance, in the case where the speed or height of the data point is too large to be mapped into the hypercube, the data point (i.e., the track) can be classified as a conventional aircraft such as a military of commercial plane.

If the data point is not preemptively removed at step 406, the process can move to step 408 wherein the data point received from the tracker 304 can be mapped into a unit within the hypercube as described above. Once the data point from the tracker 304 has been mapped to the hypercube at step 408, the process can move to 410 wherein the position of the mapped data point to a unit in the hypercube can be analyzed to determine its proximity to all other data points that are currently mapped into the hypercube. In one or more examples, two points within the hypercube can be determined to be proximal if their geometric distance within the cube is below a pre-determined threshold. For a given data point under analysis, if the data point is determined to be proximal to more than a pre-determined threshold number of other data points, then as discussed above, it is likely to be a bird. On the other hand, if the data point is not proximal to more than the pre-determined threshold number of other data points, then it likely to be something other than a bird, such as a UAV.

Thus, once the proximity to data points has been established at 410, the classifier 306 can finally make a classification as to the data point under analysis at step 412. Once the classification is made at step 412, the process can be ended at step 414.

Returning to the example of FIG. 3, the classifier 306 can output the classified tracks to a computing system 308, so as to produce a visualization of the data tracks. Because the data has been classified by classifier 306, the visualization can not only provide a visualization of the tracks to a radar operator but can also identify how each track has been classified by the classifier 306.

Figure 5:
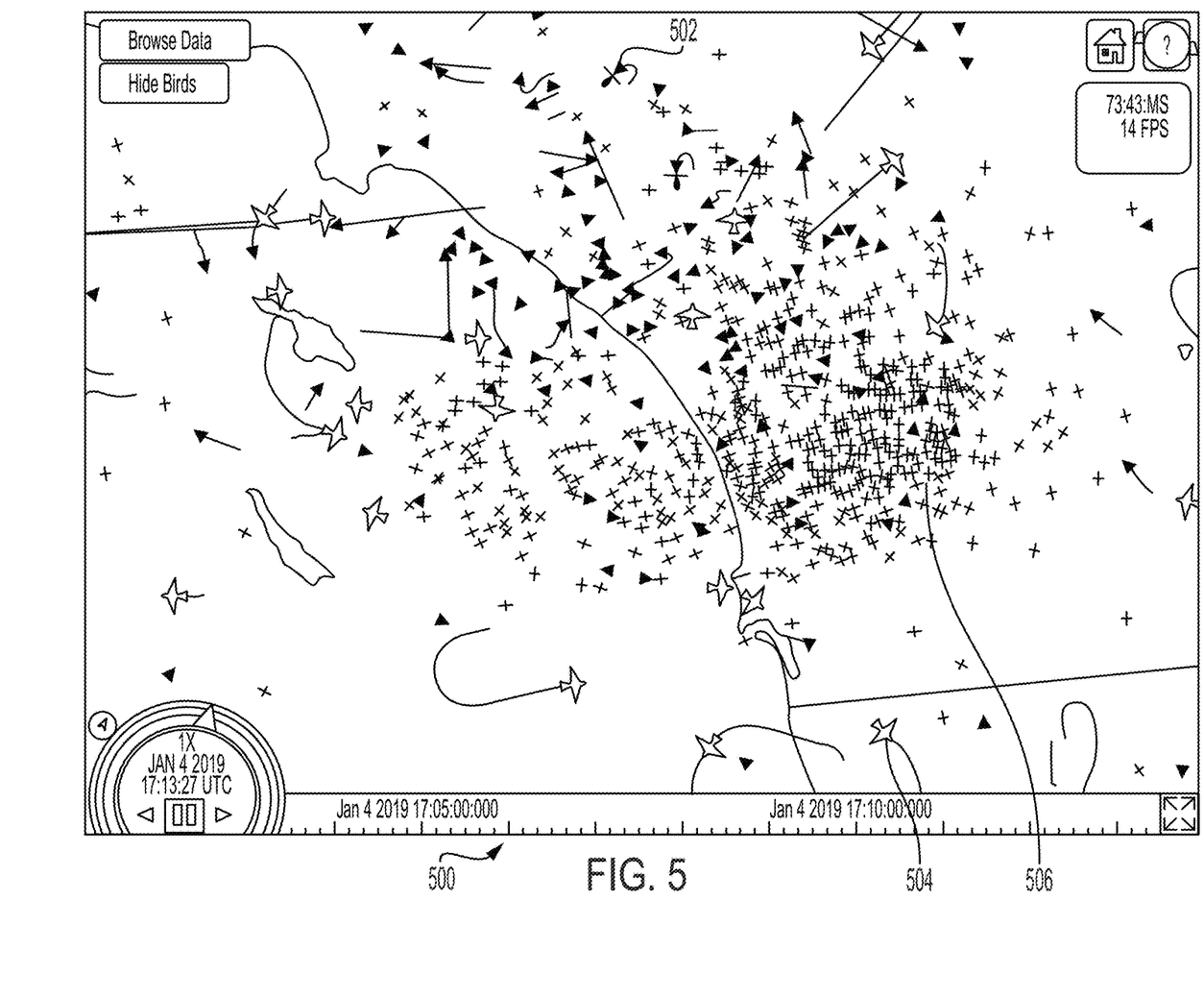
FIG. 5 illustrates an exemplary process for classifying radar data to identify UAV specific data according to examples of the disclosure.

FIG. 5 illustrates an exemplary visualization for display generated by the system of FIG. 3 according to examples of the disclosure. In the example of FIG. 5, the classifier can be configured to determine whether a particular track belongs to a bird, a UAV, or a conventional aircraft. The visualization 500 can thus include tracks designated as belonging to a UAV, for example track 502. The visualization can also include tracks identified as conventional aircraft, for instance as shown at track 504. Finally, the visualization can also include tracks that are designated as belonging to birds, for instance as shown at track 506.

Figure 6:
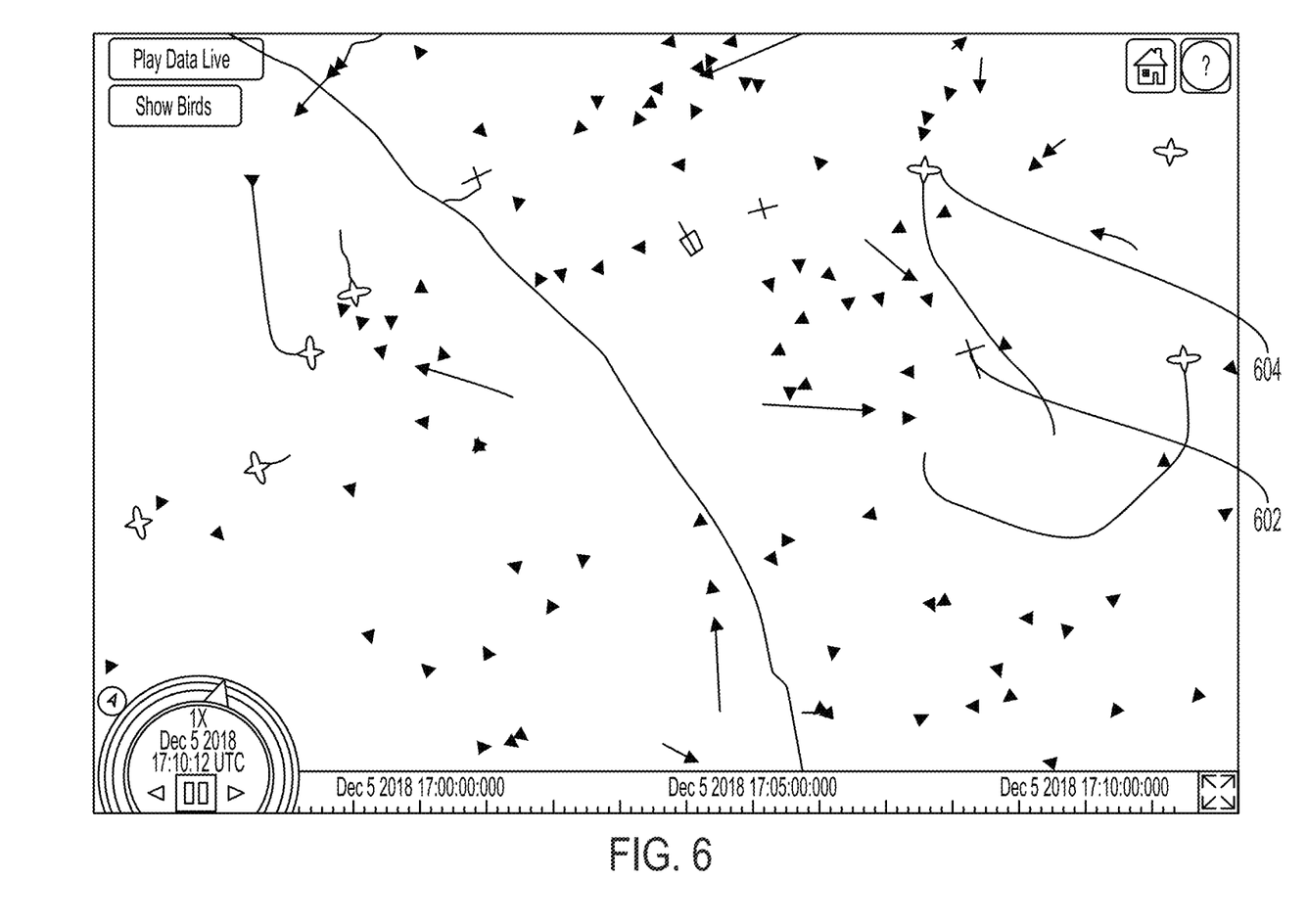
FIG. 6 illustrates an exemplary visualization for display generated by the system of FIG. 3 according to examples of the disclosure.

FIG. 6 illustrates another exemplary visualization for display generated by the system of FIG. 3 according to examples of the disclosure. In one or more examples, the radar operator can remove certain tracks from being visualized. For instance, the visualization 600 of FIG. 6 can have all of the tracks associated with birds removed from the visualization. Thus, in the example of FIG. 6, the visualization can simply include tracks associated with UAVs (such as track 602) and tracks associated with aircraft (such as track 604). By removing the birds, the visualization may be less cluttered and extraneous material that a radar operator may not care about can be removed.

Thus, as shown in the examples described above, a classifier can be used to discriminate between UAVs and other slow moving and small objects such as birds. Critically, this classification and tracking system responds automatically to changing environmental clutter and UAS conditions (concept-drift) with minimal to no operator interaction. The end result can be to provide a visual automated battle management tool to radar, weapon and aviation command and control operators that provides them with useful information that they can use to safely and efficiently process, track, classify, investigate, and engage UAVs.

While bird flocks present a changing source of nuisance tracks that are to be distinguished from UAV traffic, various persistent structures present in a radar field of view can also present persistent nuisance returns that can interfere with the tracking of UAV traffic. As an example, wind farms located in a field of view of a radar station can present unacceptable nuisance tracks that can hinder the ability to accurately track UAV traffic. Wind farms can include hundreds to thousands of wind turbines that can capture the energy from wind and convert that energy to electricity which can be used to power whole communities in an environmentally sustainable way. However, the size of the blades of each turbine can be detectable by radar, and the constant motion of the blades can be incorrectly mistaken for UAV activity. Furthermore, when a UAV flies close to a wind farm, it can be difficult to distinguish the motion of wind turbine from the flight path of a UAV.

In one or more examples, to combat the effect of wind farms, radars can raise the Continuous False Alarm Rate (CFAR) thresholds in an effort to reduce the disclosure rate of wind farms to a radar operator. The CFAR cells can be relatively large, so a single windmill can affect detection of more distant objects. Because the direct returns from wind farms are so high in amplitude, changing the CFAR will likely not suppress the return. Because the return is so persistent, it is unlikely that a return from a real object will be detected and very likely that a track from a UAV or other flying object entering the region where there is a persistent return will be updated with a report from the wind farm radar signature. When this happens, the track of a flying object being tracked may appear to change course or have a spurious speed. This may result in track loss or the appearance of a high-speed "Zoomer," which can alarm the operator (because the operator may believe that the flying object has suddenly changed speed and trajectory). Such tracks can be generated by bird returns, if the flocks are dense enough.

Thus, in order to mitigate the effects of persistent structures that can adversely affect the accurate tracking of flying objects by a radar, in one or more examples, the systems and methods described above with respect to FIGS. 1-6 can further incorporate a "clutter mask" that can be used by the radar system to ignore areas of a radar field of view which can be affected by persistent structures such as wind farms. The clutter mask can be used by a radar system to identify areas in a radar's field of view that are to be ignored, because if a UAV or other flying object were to fly into them, the likelihood of accurate tracking would significantly decrease. In order to use a clutter mask, it must first be created, and the process to create such a mask can be important to ensuring that when the mask is applied, it only eliminates areas that contain persistent nuisance tracks.

Figure 7:
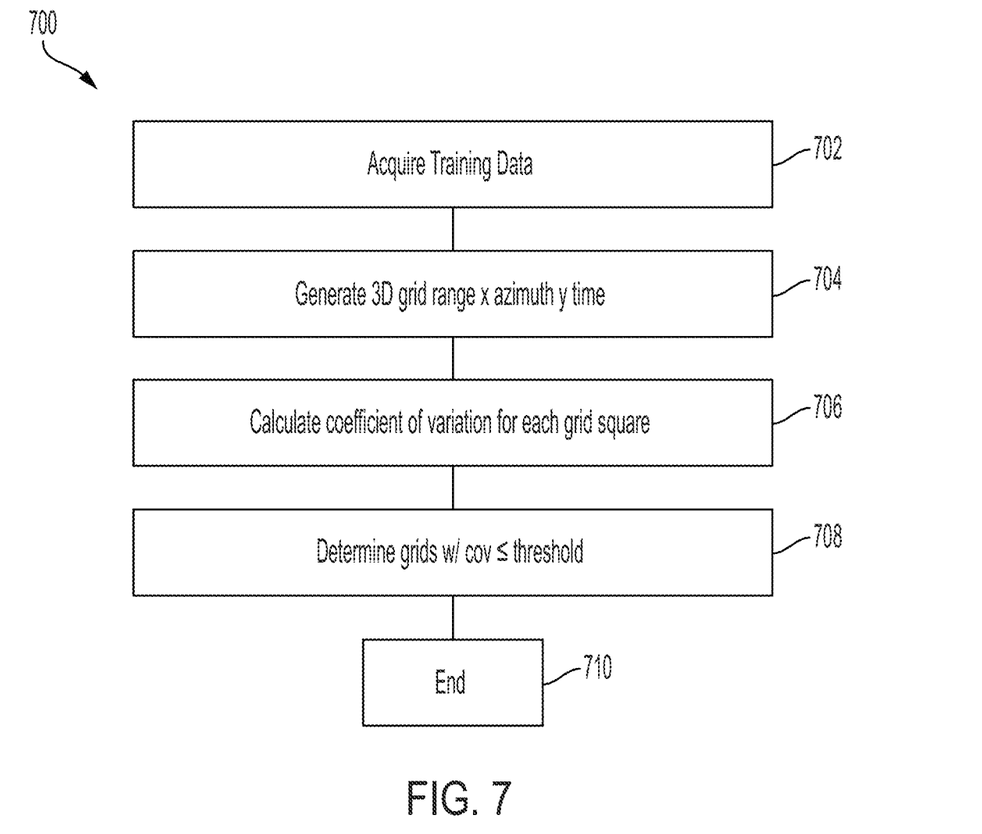
FIG. 7 illustrates an exemplary process for generating a persistent clutter mask to be applied to a track classification method according to examples of the disclosure.

FIG. 7 illustrates an exemplary process for generating a persistent clutter mask to be applied to a track classification method according to examples of the disclosure. The process 700 illustrated in FIG. 7 can begin at step 702 wherein training data for the clutter mask can be acquired. In one or more examples, training data can be acquired by running a radar system over a long period of time to receive a sufficient amount of primary radar detections to accurately train the clutter mask. In one or more examples, at step 702, a radar system can be operated for a full day (i.e., 24 hours). By operating the radar for this extended period of time so as to collect training data, the accuracy of the clutter mask can be ensured. If the training data is collected over too short of a duration of time, the clutter mask may exclude areas where there are intermittent nuisances as opposed to the persistent nuisances. Thus in one or more examples, the accuracy of the clutter mask can be proportional to the amount of time that the radar system collects data. In one or more examples, the radar system should be run for a duration of time so that the training data will be taken at a diverse set of times of day.

Once the training data has been collected at step 702, the process 700 can move to step 704 wherein a three dimensional grid is created by the radar system. In one or more examples, the three dimensional grid can be created using range, azimuth, and time as the primary axes. In one or more examples, the three dimensional grid can be used to identify the locations in a radar's field of view that include persistent nuisance tracks. Once the grid has been created, at step 704, the training data collected at step 702 can be plotted in the three dimensional grid and the number of detection in a particular grid can be counted.

Once the three-dimensional grid has been created and populated at step 704, the process 700 can move to step 706 wherein a "coefficient of variation" along the time axis can be calculated for each grid location. In one or more examples, the coefficient of variation can refer to a standardized measure of probability distribution for a given set of data. In one or more examples, the coefficient of variation can be represented by the ratio of the standard deviation of a set of data to the mean of the data. Thus, in each grid, a coefficient of variation can be calculated by determining the ratio of the standard deviation to the mean of the data in each grid of the three-dimensional grid created and populated at step 704. In one or more examples, a large coefficient of variation can indicate data that is constantly changing and thus is likely not being generated from a source that is persistent. A small coefficient of variation can indicate that the data being collected in a particular cell of a grid is persistent and rarely changes and thus may be indicative a persistent nuisance source such as a wind farm.

In one or more examples, once the coefficient of variation for each cell in the grid has been calculated at step 706, the process 700 can move to step 708 wherein each coefficient of variation calculated is compared against a pre-determined threshold to determine if it is less than the threshold. In this way, if the coefficient of variation of a particular cell within a grid is less than the pre-determined threshold, then the particular cell can be determined to include a persistent nuisance source that should be excluded (i.e., masked) during normal operation of the radar system. The identification of the cells in the grid that have a coefficient of variation that is lower than the pre-determined threshold can thus create a "mask" that can be used to identify portions of the field of view in a radar system that are to be ignored by operators and/or trackers because they will likely produce unreliable data regarding the tracked path of a flying object.

In one or more examples, the process 700 can use two grids that are offset from one another but still cover the same region. In one or more examples, the two grids can be offset by a half of a cell from each other. The two slightly offset grids can be used to capture data that straddles cells in the first grid described above. In one or more examples, after completing step 708, the process 700 can move to step 710 wherein the process is terminated.

Figure 8:
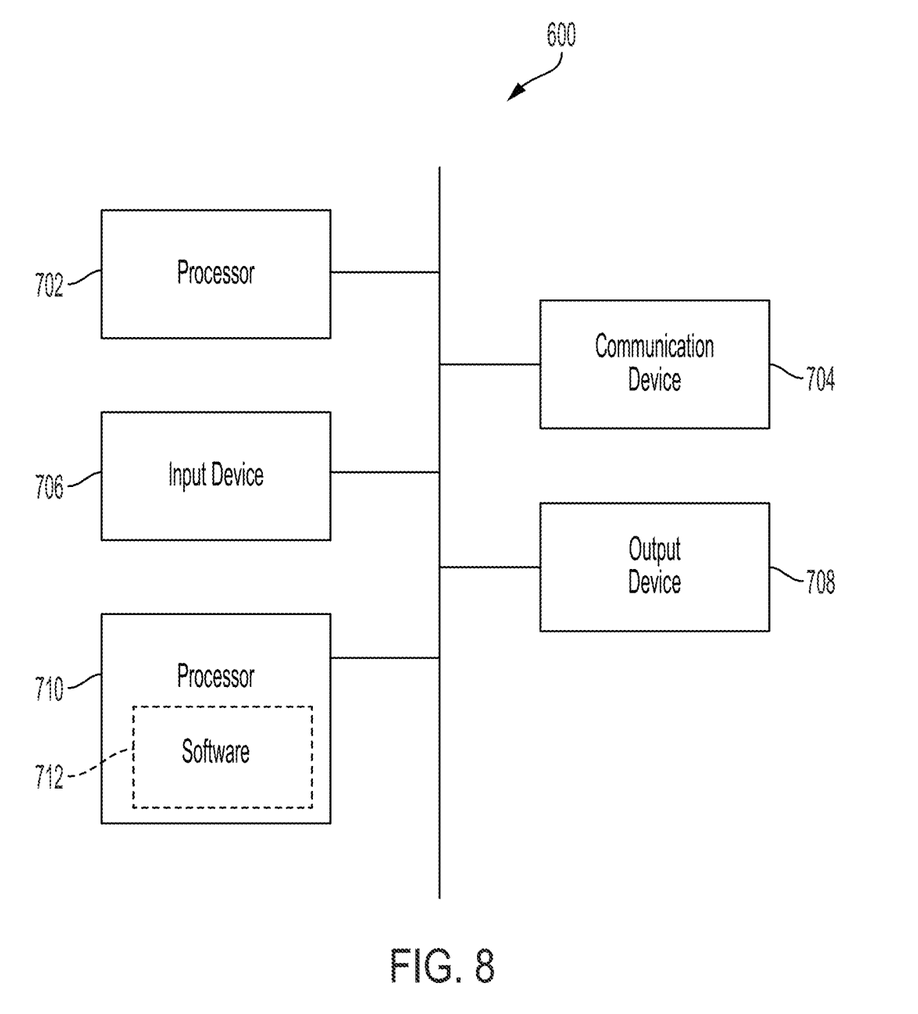
FIG. 8 illustrates an example of a computing device in accordance with one embodiment of the disclosure.

FIG. 8 illustrates an example of a computing device in accordance with one embodiment. Device 800 can be a host computer connected to a network. Device 800 can be a client computer or a server. As shown in FIG. 8, device 800 can be any suitable type of microprocessor-based device, such as a personal computer, work station, server, or handheld computing device (portable electronic device) such as a phone or tablet. The device can include, for example, one or more of processor 810, input device 820, output device 830, storage 840, and communication device 860. Input device 820 and output device 830 can generally correspond to those described above and can either be connectable to or integrated with the computer.

Input device 820 can be any suitable device that provides input, such as a touchscreen, keyboard or keypad, mouse, or voice-recognition device. Output device 830 can be any suitable device that provides output, such as a touchscreen, haptics device, or speaker.

Storage 840 can be any suitable device that provides storage, such as an electrical, magnetic, or optical memory including a RAM, cache, hard drive, or removable storage disk. Communication device 860 can include any suitable device capable of transmitting and receiving signals over a network, such as a network interface chip or device. The components of the computer can be connected in any suitable manner, such as via a physical bus, or wirelessly.

Software 850, which can be stored in storage 840 and executed by processor 810, can include, for example, the programming that embodies the functionality of the present disclosure (e.g., as embodied in the devices described above).

Software 850 can also be stored and/or transported within any non-transitory, computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 840, that can contain or store programming for use by or in connection with an instruction-execution system, apparatus, or device.

Software 850 can also be propagated within any transport medium for use by or in connection with an instruction-execution system, apparatus, or device, such as those described above, that can fetch instructions associated with the software from the instruction-execution system, apparatus, or device and execute the instructions. In the context of this disclosure, a transport medium can be any medium that can communicate, propagate, or transport programming for use by or in connection with an instruction-execution system, apparatus, or device. The transport readable medium can include, but is not limited to, an electronic, magnetic, optical, electromagnetic, or infrared wired or wireless propagation medium.

Device 800 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 800 can implement any operating system suitable for operating on the network. Software 850 can be written in any suitable programming language, such as C, C++, Java, or Python. In various embodiments, application software embodying the functionality of the present disclosure can be deployed in different configurations, such as in a client/ server arrangement or through a Web browser as a Web-based application or Web service, for example.

The foregoing description, for purpose of explanation, has made reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments, with various modifications, that are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

What is claimed is:

1. A method for classifying flying objects in an airspace, the method comprising:
    generating a persistent clutter mask, comprising:
        mapping training data to a three-dimensional grid corresponding to a field of view of a radar system, and determining one or more cells of the grid that have a coefficient of variation below a predetermined threshold, wherein the persistent clutter mask comprises the one or more cells of the grid that have a coefficient of variation below the predetermined threshold;
    receiving plot data from the radar system, wherein the plot data indicates a location of one or more flying objects encountered by the radar system;
    masking a portion of the received plot data based on the persistent clutter mask;
    identifying one or more values of attributes belonging to the one or more flying objects based on portions of the received plot data from the radar system that are not masked;
    classifying each identified flying objects into one or more categories based on their one or more values of one or more attributes, wherein classifying the identified flying objects into one or more categories comprises:
        generating a hypercube with a plurality of dimensions, wherein each dimension of the hypercube is based on an attribute of the one or more attributes;
        mapping each identified flying object's one or more attributes to a data point within the hypercube;
        determining one or more geometric proximities of the data point to one or more previously mapped data points within the hypercube; and
        placing the identified flying object into one or more categories based on the one or more geometric proximities to the one or more previously mapped data points within the hypercube.

2. The method of claim 1, wherein identifying one or more values of one or more attributes belonging to the one or more flying objects based on the received plot data includes identifying a speed, altitude, and flight path of each identified flying object.

3. The method of claim 1, wherein the plot data is received from a radar system configured to generate plot data for flying objects that are smaller than a pre-determined size threshold, and are slower than a pre-determined speed threshold.

4. The method of claim 1, wherein mapping each identified flying object's one or more attributes to a data point within the hypercube includes excluding one or more identified flying objects from being mapped to a data point based on their one or more attributes.

5. The method of claim 1, wherein determining one or more geometric proximities of the data point to one or more previously mapped data points within the hypercube includes determining a geometric distance from the data point to each of the one or more previously mapped data points.

6. The method of claim 5, the method further comprising determining how many previously mapped data points of the one or more previously mapped data points are within a pre-determined geometric proximity to the data point.

7. The method of claim 6, wherein placing the identified flying object into one or more categories based on the one or more geometric proximities to the one or more previously mapped data points within the hypercube includes placing an identified flying object into an unmanned aerial vehicle category if the determination of how many previously mapped data points of the one or more previously mapped data points are within a pre-determined geometric proximity to the data point is below a pre-determined threshold.

8. The method of claim 1, wherein masking the portion of the received plot data based on the persistent clutter mask comprises:
    excluding a portion of the received plot data based on a location of one or more persistent nuisance sources.

9. The method of claim 8, wherein the method further comprises:
    determining the location of the one or more persistent nuisance sources, wherein determining the location of the one or more persistent nuisance sources comprises applying the persistent clutter mask to the received plot data.

10. The method of claim 9, wherein the persistent clutter mask is generated based on:
    training data received from the radar system.

11. A system for identifying one or more flying objects in an airspace, the system comprising:
    a radar system configured to generate plot data wherein the plot data indicates a location of one or more flying objects encountered by the radar system;
    one or more processors, wherein the one or more processors are configured to execute instructions stored on the memory to cause the system to:
        generate a persistent clutter mask, comprising:
            mapping training data to a three-dimensional grid corresponding to a field of view of the radar system, and determining one or more cells of the grid that have a coefficient of variation below a predetermined threshold, wherein the persistent clutter mask comprises the one or more cells of the grid that have a coefficient of variation below the predetermined threshold;
        mask a portion of the generated plot data based on the persistent clutter mask;
        identify one or more values of one or more attributes belong to the one or more flying objects based on portions of the plot data from the radar system that are not masked;
        classify each identified flying objects into one or more categories based on their one or more values of one or more attributes, wherein classifying the identified flying objects into one or more categories comprises:

generating a hypercube with a plurality of dimensions, wherein each dimension of the hypercube is based on an attribute of the one or more attributes;

mapping each identified flying object's one or more attributes to a data point within the hypercube;

determining one or more geometric proximities of the data point to one or more previously mapped data points within the hypercube; and placing the identified flying object into one or more categories based on the one or more geometric proximities to the one or more previously mapped data points within the hypercube.

12. The system of claim 11, wherein identifying one or more values of one or more attributes belonging to the one or more flying objects based on the received plot data includes identifying a speed, altitude, and flight path of each identified flying object.

13. The system of claim 11, wherein the plot data is received from a radar system configured to generate plot data for flying objects that are smaller than a pre-determined size threshold, and are slower than a pre-determined speed threshold.

14. The non-transitory computer-readable storage medium of claim 13, wherein identifying the one or more values of one or more attributes belonging to the one or more flying objects based on the received plot data includes identifying a speed, altitude, and flight path of each identified flying object.

15. The non-transitory computer-readable storage medium of claim 13, wherein the plot data is received from a radar system configured to generate plot data for flying objects that are smaller than a pre-determined size threshold, and are slower than a pre-determined speed threshold.

16. The non-transitory computer-readable storage medium of claim 13, wherein mapping each identified flying object's one or more attributes to a data point within the hypercube includes excluding one or more identified flying objects from being mapped to a data point based on their one or more attributes.

17. The non-transitory computer-readable storage medium of claim 13, wherein determining one or more geometric proximities of the data point to one or more previously mapped data points within the hypercube includes determining a geometric distance from the data point to each of the one or more previously mapped data points.

18. The system of claim 11, wherein mapping each identified flying object's one or more values of one or more attributes to a data point within the hypercube includes excluding one or more identified flying objects from being mapped to a data point based on their one or more attributes.

19. The system of claim 11, wherein determining one or more geometric proximities of the data point to one or more previously mapped data points within the hypercube includes determining a geometric distance from the data point to each of the one or more previously mapped data points.

20. The system of claim 11, the wherein the one or more processors are configured to execute the instructions stored on the memory to cause the system to: determine how many previously mapped data points of the one or more previously mapped data points are within a pre-determined geometric proximity to the data point.

21. The system of claim 20, wherein placing the identified flying object into one or more categories based on the one or more geometric proximities to the one or more previously mapped data points within the hypercube includes placing an identified flying object into an unmanned aerial vehicle category if the determination of how many previously mapped data points of the one or more previously mapped data points are within a pre-determined geometric proximity to the data point is below a pre-determined threshold.

22. The non-transitory computer-readable storage medium of claim 21, the method further comprising determining how many previously mapped data points of the one or more previously mapped data points are within a pre-determined geometric proximity to the data point.

23. The system of claim 11, wherein masking the portion of the generated plot data based on the persistent clutter mask comprises:

excluding a portion of the received plot data based on a location of one or more persistent nuisance sources.

24. The system of claim 23, wherein the one or more processors are configured to execute the instructions stored on the memory to cause the system to:

determine the location of the one or more persistent nuisance sources, wherein determining the location of the one or more persistent nuisance sources comprises applying the persistent clutter mask to the generated plot data.

25. The system of claim 24, wherein the persistent clutter mask is generated based on:

training data received from the radar system.

26. The non-transitory computer-readable storage medium of claim 23, wherein placing the identified flying object into one or more categories based on the one or more geometric proximities to the one or more previously mapped data points within the hypercube includes placing an identified flying object into an unmanned aerial vehicle category if the determination of how many previously mapped data points of the one or more previously mapped data points are within a pre-determined geometric proximity to the data point is below a pre-determined threshold.

27. A non-transitory computer-readable storage medium storing one or more programs for tracking one or more flying objects in an airspace, the one or more programs configured to be executed by one or more processors communicatively coupled to one or more processors of a system, the one or more programs including instructions to cause the system to:

generate a persistent clutter mask, comprising:

mapping training data to a three-dimensional grid corresponding to a field of view of a radar system, and determining one or more cells of the grid that have a coefficient of variation below a predetermined threshold, wherein the persistent clutter mask comprises the one or more cells of the grid that have a coefficient of variation below the predetermined threshold;

receive plot data from the radar system wherein the plot data indicates a location of one or more flying objects encountered by the radar system;

mask a portion of the received plot data based on the persistent clutter mask:

identify one or more values of one or more attributes belonging to the one or more flying objects based on portions of the received plot data from the radar system that are not masked;

classify each identified flying objects into one or more categories based on their one or more values of one or more attributes, wherein classifying the identified flying objects into one or more categories comprises:

generating a hypercube with a plurality of dimensions, wherein each dimension of the hypercube is based on an attribute of the one or more attributes;

mapping each identified flying object's one or more values of one or more attributes to a data point within the hypercube;

determining one or more geometric proximities of the data point to one or more previously mapped data points within the hypercube; and placing the identified flying object into one or more categories based on the one or more geometric proximities to the one or more previously mapped data points within the hypercube.

28. The non-transitory computer-readable storage medium of claim 27, wherein masking the portion of the received plot data based on the persistent clutter mask comprises:

exclude a portion of the received plot data based on a location of one or more persistent nuisance sources.

29. The non-transitory computer-readable storage medium of claim 28, wherein the system is further caused to:

determine the location of the one or more persistent nuisance sources, wherein determining the location of the one or more persistent nuisance sources comprises applying the persistent clutter mask to the received plot data.

30. The non-transitory computer-readable storage medium of claim 29, wherein the clutter mask is generated based on:

training data received from the radar system.

\* \* \* \* \*